Aug. 30, 1938.	S. M. NAMPA ET AL	2,128,376
CAR LOADING DEVICE
Filed Jan. 6, 1936	2 Sheets-Sheet 1

INVENTORS.
Sulo M. Nampa,
Stuart C. Japinga.
BY
Harness, Dickey, Pierce & Ham
ATTORNEYS.

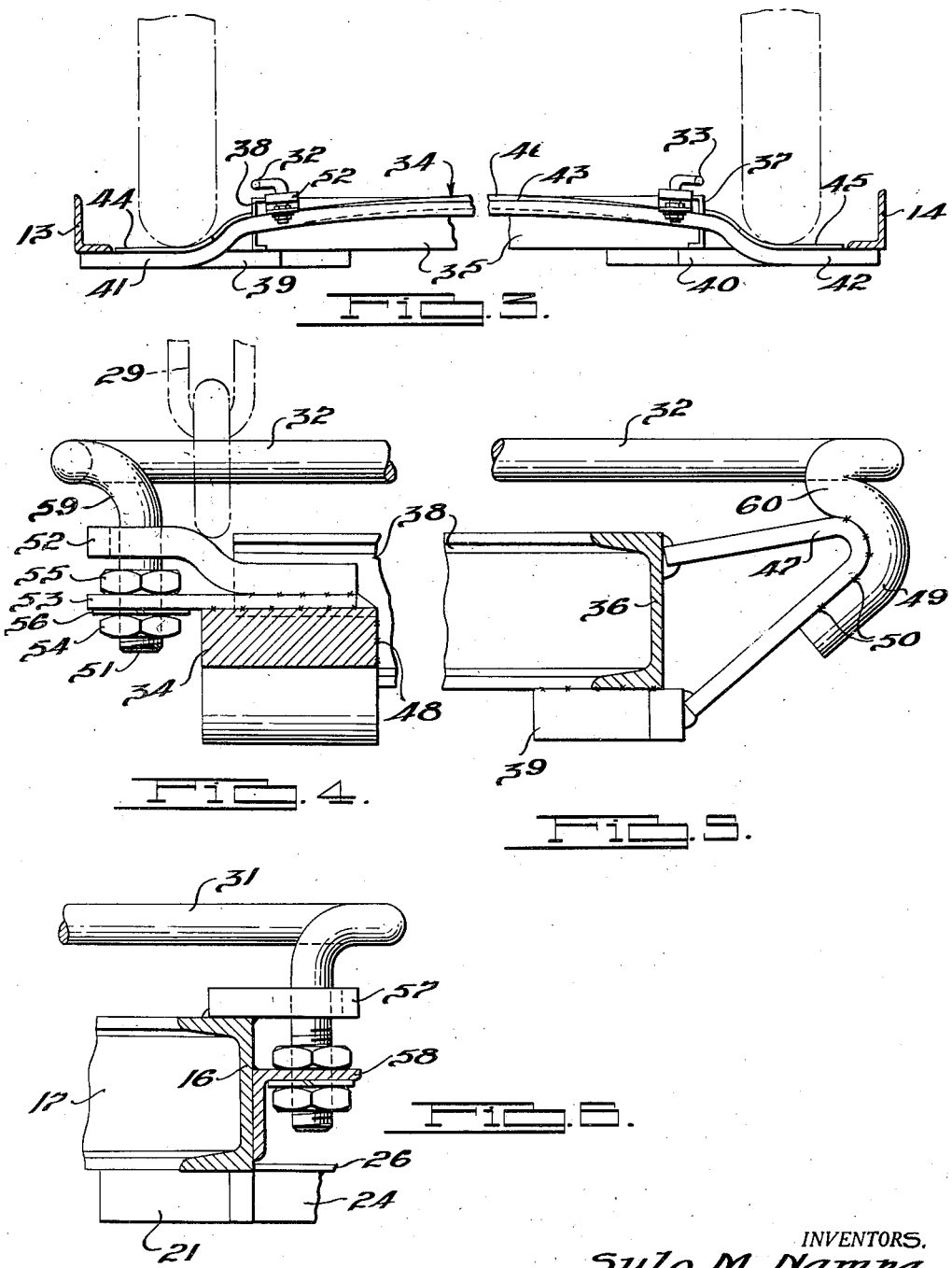

Patented Aug. 30, 1938

2,128,376

UNITED STATES PATENT OFFICE 2,128,376

CAR LOADING DEVICE

Sulo M. Nampa and Stuart C. Japinga, Detroit, Mich., assignors to The Worth Company, a corporation of Michigan Application January 6, 1936, Serial No. 57,670

4 Claims. (Cl. 105—368)

This invention relates to automobile loading devices of the type disclosed in the co-pending application of Samuel D. Butterworth, Serial No. 646,830, filed December 12, 1932.

An object of the invention is to improve the frame construction disclosed in said Butterworth application, with particular reference to the cross frame members and wheel supporting plates of said frame.

Another object of the invention is to provide a frame construction that will afford greater head room for automobiles positioned upon the floor of the freight car below the loading frame.

Another object of the invention is to provide an improved automobile anchoring member secured to the frame.

Other objects and advantages of the invention will appear from the accompanying drawings and the specification and claims hereinafter set forth.

In the drawings, in which a preferred form of the invention is shown:

Fig. 3 is a sectional view taken on the line 3—3 of Fig. 2;

Figure 2:
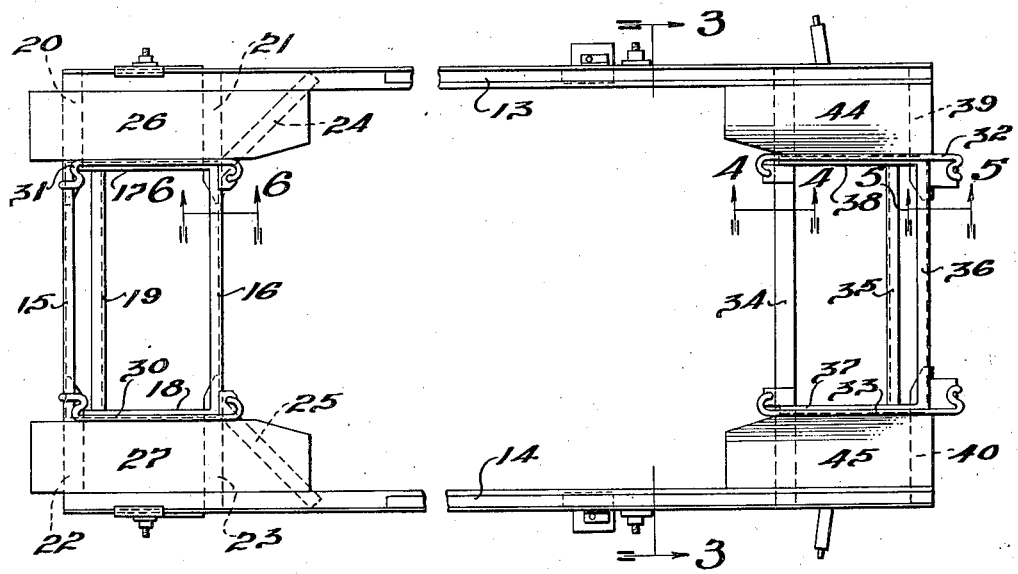
Fig. 2 shows a plan view of the loading frame itself.

Figs. 4 and 5 are sectional views, taken on the lines 4—4 and 5—5 of Fig. 2; and Fig. 6 is a section taken on the line 6—6 of Fig. 2.

Figure 1:
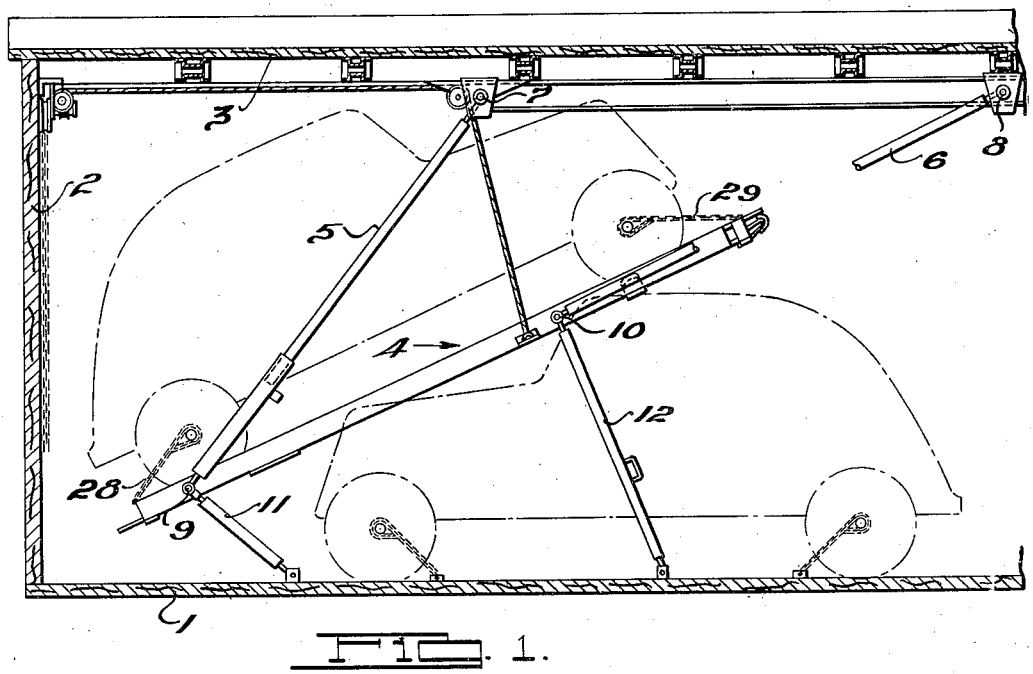
Figure 1 shows a vertical longitudinal section of one end of a freight car illustrating the loading frame in operative position.

Referring to Fig. 1, a loading frame, indicated generally at 4, is mounted in a conventional box car having a floor 1, end wall 2 and a roof 3. The loading frame is connected to the freight car by rods 5 and 6 pivotally connected, respectively, to the car, at 7 and 8, and to the frame at 9 and 10. The frame is adapted to be swung on these rods from a position adjacent the floor to the elevated and inclined position shown in Fig. 1, where it may be braced in position by struts 11 and 12. It will be understood that rods 5 and 6 and struts 11 and 12 are duplicated on the opposite side of the frame. For a fuller description of the frame and mounting, reference may be had to the aforementioned application of Samuel D. Butterworth, Serial No. 646,830.

The frame proper, as shown in Fig. 2, comprises longitudinally extending members 13 and 14 connected together at their ends by end frame structures to be described hereinafter. The end frame structure at the lower end of the frame, shown at the left in Fig. 2, comprises a rectangular frame section formed by transverse channel members 15 and 16 connected adjacent their ends by longitudinal channel members 17 and 18. An additional transverse channel member 19, positioned intermediate the channels 15 and 16, is also connected at its end to longitudinal channels 17 and 18. This rectangular frame is integrally secured to the longitudinal frame members 13 and 14 by means of four plates or bars 20, 21, 22 and 23, each of which is welded to the under side of one of the main longitudinal channel members and also to the under side of one corner of the rectangular frame section previously described. Diagonal brace members 24 and 25 may be provided between the members 21 and 23, respectively, and the adjacent longitudinal frame members 13 and 14. A wheel supporting plate 26 is welded to the top surfaces of members 20, 21 and 24, while at the opposite side of the frame a wheel supporting plate 27 is similarly supported by and connected to members 22, 23 and 25.

When an automobile is positioned upon the frame, it is secured in place by chains 28 and 29 which are looped about the axles or any suitable portions of the automobile and have rings at their opposite ends threaded on anchor bars 30, 31, 32 and 33 secured adjacent the four corners of the frame.

The anchor bars 30, 31, 32 and 33 are of the type disclosed in applicants' co-pending application Serial No. 735,772, filed July 18, 1934, but they embody an improved connecting means to be hereinafter described.

The end frame portion for the upper end of the loading frame comprises a rectangular frame structure including transverse members 34, 35 and 36 and longitudinal members 37 and 38. This rectangular frame is similar to that provided at the lower end of the loading frame, except that the transverse member 34 extends entirely across the loading frame and is connected at its ends to the longitudinal frame members 13 and 14. This member 34 is of a peculiar configuration, as will be hereinafter described. The lower end of the rectangular end frame structure 34, 35, 36, 37 and 38, therefore, is connected to the main longitudinal frame members 13 and 14 directly, at one end, by the member 34, while at the opposite end said rectangular frame is connected by members 39 and 40 which are welded to the under side of the frame members 13 and 14, respectively, and to the under side of the forward or upper corners of the rectangular frame structure.

As best shown in Fig. 3, the transverse frame member 34 comprises a bar having flat end portions 41 and 42 and an intermediate upwardly bowed portion 43. The top surfaces of the flat end portions 41 and 42 are welded to the under side of the longitudinal frame members 13 and 14, and the lower ends of longitudinal frame members 37 and 38 are notched at 48, in Fig. 4, to receive the bar 34 and are welded thereto. The central portion of the upwardly bowed section of bar 34 is arched transversely of the bar, as shown at 46 in Fig. 3 and in dotted lines in Fig. 1, to provide additional depth and therefore increased rigidity at this location.

Wheel supporting plate 44 is carried by the flat end portion 41 of bar 34 and by the adjacent member 39, while plate 45 is similarly carried by the opposite end 42 of bar 34 and member 40. Plates 44 and 45 extend inwardly over a portion of the upwardly bowed portion of bar 34 and conform to the top surface of the portions of this bar with which they are in contact. This results in the provision of wheel supporting plates having upwardly and S-curved inner edges. This is of advantage in that it provides tire retaining and centering flanges that will not cause injury to the tires in the event that the car is not properly centered on the frame.

The improved mounting for the anchor bars 30, 31, 32 and 33 is best illustrated in Figs. 4, 5 and 6. Referring to Fig. 5, which shows the mounting for one end of anchor rod 32, there is provided a V-shaped supporting plate 47 having one leg welded to transverse channel 36 and the other to member 39. One end of rod 32 is bent as shown at 49 to conform to the apex of the plate 47, and is welded thereto as indicated at 50.

The mounting for the opposite end of rod 32 is shown in Fig. 4. It will be noted that this end of the rod is bent downwardly at 51 and extends through aligned openings in a pair of spaced members 52 and 53, which, in turn, are welded together and to the top surface of bar 34. The end 51 of rod 32 is threaded to receive a pair of nuts 54 and 55 positioned respectively on opposite sides of member 53. A lock washer 56 may be positioned between the nut 54 and member 53.

It will be observed that the rod 32 by reason of its integral connection at one end to the frame, cannot become accidentally dislodged. Moreover, the integral connection, combined with the inherent rigidity of rod 32, maintains the free end 51 of the rod in its normal position extending through the openings in members 52 and 53, with the result that regardless of nuts 54 and 55, the ring on the associated anchor chains cannot become accidentally dislodged from the anchor rod. However, when it is desired to remove the chain for any reason, this may be accomplished by removing nuts 54 and 55 and bending rod 32 to release the end 51 thereof from the openings in members 52 and 53. The nuts 54 and 55 normally prevent such accidental deformation of the anchor rod. It will be seen that we have combined the advantages of an integrally connected anchor rod for permanently connecting the anchor chain to the frame, with a structure which may be deformed to release the chain when necessary, without injury to any of the parts thereof.

The anchor rods 30 and 31 at the lower end of the frame are mounted similarly to those at the upper end, with the exception, as shown in Fig. 6, that the free end of rod 31, for example, passes through a block 57 welded to the top of channel member 16, and through an angle member 58 which is welded to the side of channel 16.

It will be noted by reference to Fig. 4 that the inner ends of the chain anchor rods, such as 32, are provided with a horizontally positioned U-bend and the free end of the rod is then bent downwardly as at 51. This creates a notch or gooseneck 59 opening inwardly from the adjacent end of the frame and into which the chain may be engaged when an automobile of greater length than normal is loaded. In this event the chain 28 in Fig. 1 will extend rearwardly and the chain 29 will extend forwardly into engagement with the automobile instead of in the manner shown in Fig. 1. In the position shown in Fig. 1, the chains are engaged in the reverse bends at the outer ends of rods, as at 60 on rod 32.

The provision of an upwardly bowed transverse frame member 34 adjacent the upper end of the frame is of primary advantage in that it affords greater head room for an automobile positioned upon the floor beneath the frame. This is indicated diagrammatically in Fig. 1 which shows in dotted lines an automobile positioned upon the floor and below the loading frame. As a result of the upwardly bowed bar an automobile may be positioned on the floor quite close to the end wall of the freight car without restricting the clearance between the roof of such automobile and the adjacent transverse frame members.

A second advantage of the arched connecting bar is that it facilitates the support of wheel pads having upwardly S-curved inner edges as previously described.

While only one form of the invention has been disclosed, it will be apparent that various modifications thereof may be indulged in without departing from the spirit thereof or the scope of the appended claims.

What we claim is:

1. In combination with an automobile loading frame, an anchor bar integrally connected at one end thereof to said frame and having an intermediate straight portion and an opposite end portion extending at right angles to said straight portion, means on said frame having an opening for the reception of said opposite end portion, said end portion being maintained in said opening against the force of normal anchoring loads by reason of the inherent rigidity of said bar, means associated with said bar for preventing accidental removal of said end portion from said opening incident to abnormal loads, and means for anchoring an automobile on said frame engaging with said bar intermediate its ends and removable endwise of said bar only when said opposite end thereof is removed from said opening.

2. In combination with an automobile loading frame, an anchor bar integrally secured at one end thereof to said frame and having an opposite end portion extending at right angles to the main body of said bar and provided with screw threads, means on said frame providing a pair of spaced members having axially aligned openings therein for the reception of said threaded end of the anchor bar, and a pair of nuts on said threaded end on opposite sides of one of said spaced members.

3. An automobile loading frame including a bar integrally secured to the frame and having a portion at a point remote from the integral connection located in proximity to a portion of the frame to provide a closed loop for the reception of an automobile anchoring chain threaded on said bar, said bar having sufficient rigidity to prevent opening of said loop incident to normal anchoring loads but having a portion which may be deformed if desired to open the loop and release the chain, and means for holding said portion against accidental deformation incident to abnormal loads.

4. An automobile loading frame having an opening therein, a bar integrally connected to said frame and having one end thereof at a point remote from the integral connection extending through said opening in the frame to provide a closed loop for the reception of an automobile anchoring chain threaded on said bar, said bar having sufficient inherent rigidity to prevent deformation and consequently withdrawal thereof from said opening incident to normal anchoring loads, and means to prevent accidental withdrawal of said bar from said opening incident to the application of abnormal deforming loads applied to the bar.

SULO M. NAMPA.
STUART C. JAPINGA.